US008557434B2

(12) United States Patent
Taniguchi et al.

(10) Patent No.: US 8,557,434 B2
(45) Date of Patent: Oct. 15, 2013

(54) PRISMATIC CELL, METHOD OF MANUFACTURING THEREOF, AND ASSEMBLED BATTERY USING THE SAME (75) Inventors: Yasutomo Taniguchi, Minamiawaji (JP); Yasuhiro Yamauchi, Sumoto (JP); Toshiyuki Nohma, Kobe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 163 days.

(21) Appl. No.: 13/021,230

(22) Filed: Feb. 4, 2011

(65) Prior Publication Data

US 2011/0195301 A1 Aug. 11, 2011

(30) Foreign Application Priority Data

Feb. 5, 2010 (JP) .................................. 2010-024521
Mar. 19, 2010 (JP) .................................. 2010-065006

(51) Int. Cl.
*H01M 2/02* (2006.01)
*H01M 2/04* (2006.01)

(52) U.S. Cl.
USPC .......................................... 429/163; 429/175

(58) Field of Classification Search
USPC ................................................ 429/163, 175
See application file for complete search history.

(56) References Cited

U.S. PATENT DOCUMENTS

| 4,255,502 A * | 3/1981 | Taylor, III ............... 429/163 |
| 2006/0208700 A1 | 9/2006 | Kim et al. |
| 2008/0160395 A1 | 7/2008 | Okada et al. |

FOREIGN PATENT DOCUMENTS

| JP | 2002-184364 A | 6/2002 |
| JP | 2003-223872 A | 8/2003 |
| JP | 2004-319260 A | 11/2004 |
| JP | 2006-120419 A | 5/2006 |
| JP | 2006-269425 A | 10/2006 |
| JP | 2008-166191 A | 7/2008 |

\* cited by examiner

*Primary Examiner* — Tracy Dove
(74) *Attorney, Agent, or Firm* — Westerman, Hattori, Daniels & Adrian, LLP (57) ABSTRACT

The present invention aims to provide a method for insulatively covering the side surfaces and bottom of a prismatic outer can in a simple manner. This can be realized by adopting the following configuration: a prismatic cell including a prismatic outer can having an opening at the top thereof; a sealing body for sealing the opening; and positive and negative electrode external terminals that are protruded from and insulated from the sealing body, wherein the prismatic outer can is covered on the side surfaces and entire bottom with a piece of folded insulation sheet. Preferably, the bottom of the prismatic outer can is covered with only one piece of the insulating sheet, and all edges of the insulating sheet is positioned above the bottom of the outer can.

16 Claims, 8 Drawing Sheets

PRISMATIC CELL, METHOD OF MANUFACTURING THEREOF, AND ASSEMBLED BATTERY USING THE SAME

BACKGROUND OF THE INVENTION

1. Field of the Invention

The present invention relates to a prismatic cell and an assembled battery using the prismatic cell.

2. Background Art

In recent years, a cell-powered car using a secondary cell as a power source, such as an electric vehicle (EV) and a hybrid electric vehicle (HEV), has been becoming popular. However, a high power secondary cell is required for such a cell-powered vehicle.

For usage requiring high output such as EV and HEV, a battery pack (assembled battery) has been used in which multiple cells are connected in series and/or in parallel. In connection of multiple cells, a prismatic cell is more excellent in space efficiency than a cylindrical cell. Therefore, a prismatic cell is often used as a cell constituting an assembled battery.

In addition, because a high-output cell requires stable extraction of current and easy connection of a plurality of cells, there is used a configuration in which its positive and negative electrode external terminals are protruded and insulated from a sealing body.

In the case that a plurality of the cells are connected to form an assembled battery, when an outer can of the assembled battery is polarized due to a contact with an electrode assembly housed therein and so on, a short-circuit may occur by a contact between the outer can and another can that is charged with opposite polarity. To prevent this short circuit, Patent Documents 1 to 6 have proposed technologies in which side and bottom surfaces of the outer can are insulatively covered.

[Patent Document 1] Japan Patent Application Publication No. 2002-184364

[Patent Document 2] Japan Patent Application Publication No. 2003-223872

[Patent Document 3] Japan Patent Application Publication No. 2004-319260

[Patent Document 4] Japan Patent Application Publication No. 2006-120419

[Patent Document 5] Japan Patent Application Publication No. 2006-269425

[Patent Document 6] Japan Patent Application Publication No. 2008-166191

Patent Document 1 discloses a technology in which a resin film overlaps only on one of the side surfaces of a bare cell along the bare cell, and the overlapped part is bonded by at least one of a heat seal, a glue or an adhesive, and then the side surface of the bare cell and the resin film are attached to each other or heated after covering, and thereby the resin film is formed so as to have shrinking stress. It is described that this technology allows attachment of an exterior film without a decrease in space efficiency.

Patent Document 2 is characterized as follows. A shrink film drawn in a tube-like shape is cut to a predetermined length, and the lithium ion secondary cell body is put into this shrink film, and further the shrink film is sealed in a sack-like shape at the edge of the negative electrode side of the cell, or is formed in a belt-like shape, in order to cover the periphery of the lithium ion secondary battery body including an insulative lid member with the shrink film by means of heat shrinking. It is described that this technology allows a rapid and stable covering.

Patent Document 3 is characterized as follows. At least one surface of long side surfaces, short side surfaces, a bottom surface, and a lid surface, constituting a secondary cell container for housing a cell element such as an electrode, an electrolyte or a separator, are formed of different materials of metal-resin composite plate or thermoplastic resin. And a contact part of a metal-resin composite plate wall surface with a thermoplastic resin surface is integrally formed of the metal-resin composite plate and the thermoplastic resin. This technique provides a secondary cell container that overcomes the drawbacks of lowering adhesion strength during hot-cold cycle, and that excels in a water vapor barrier property and a gas barrier property against gases such as hydrogen and oxygen generated in the cell, and that excels in radiation of heat generated during charging and discharging of the cell.

Patent Document 4 discloses a technology in which a barrier member for preventing moisture permeation is provided at least at a corner of a case whose external surface is covered with an outer package film. It is described that this technology allows to prevent moisture permeation from the corner portion of the case.

Patent Document 5 discloses a technology in which a group of electrodes is housed in a case where an insulation layer including an oxide coating is formed on its surface. It is described that this technology can provide a secondary cell with improved structural safety and reliability as well as insulation property.

Patent Document 6 is characterized as follows. A periphery of an outer can is covered with a plurality of separators that have electric insulating characteristics and heat insulating characteristics. Each separator is interposed between mutual cells so that the outer can is contacted with both faces of the separators. And the electrode terminal is exposed with the outer can covered with the separators, and thereby this part is connected. It is described that this technique allows to cover the periphery of the cell except an area that is not necessary to be covered, and to effectively prevent an unintended short circuit and the like.

BRIEF SUMMARY OF THE INVENTION

However, in the technologies according to Patent documents 1 and 2, since a folding portion of the insulating film is arranged at the bottom the outer can, the height of the cell increases due to the folding, and variation in the height of the cell tends to occur. If multiple cells having a variation in their heights are combined to form an assembled battery, work efficiency is decreased, and further there may result in a bad contact between connection members that connect the cells to each other.

In the Patent Document 3, a case needs to be used, at least one of whose long side surfaces, short side surfaces, bottom surface, and lid surface are formed of different materials of metal-resin composite plate or thermoplastic resin. Hence, there is a problem that this structure increases a manufacturing cost.

In addition, Patent Document 4 discloses to provide a barrier member in a case made of resin. Although it is highly insulative, there is a problem that the case does not have sufficient strength against impact and so on.

In Patent document 5, there is a problem that the insulation layer is an oxide coating that is easy to be peeled off by impact and so on, and thus a conductive layer is easily exposed, and sufficient insulation is not available.

Moreover, when the present inventors produced an assembled battery using the cell disclosed in Patent Document 6, it was found that a short circuit occurred due to water resulting from dew condensation and the like. This mechanism is described below.

In the cell disclosed in Patent Document 6, its circuit cannot be shorted by contact with another cell. However, when dew condensation water exists on the floor portion on which the assembled battery is disposed, the water infiltrates from a gap of the separator covering the outer can. The infiltrating water results in a short circuit due to the following closed circuit: [Inside of the cell] positive electrode/electrolyte/outer can→[Outside of the cell] outer can/dew condensation water/a floor made of a conductive material/dew condensation water/outer can→[Internal Cell] outer can/electrolyte/negative electrode→negative electrode/negative electrode external terminal/a busbar (a connecting member)/positive electrode external terminal/positive electrode. Such a short circuit may occur not only between adjacent cells, but also between cells with one or more cells interposed therebetween. When one or more cells are interposed, since a potential difference is increased because of the interposed cells, the potential may result in a rapid corrosion of the outer can and the terminals.

The present invention has been made in view of the above. Its first object is to provide a prismatic cell in which an external surface of the outer can be surely insulated in a simple manner. In addition, its second object is to reduce a variation in height of the prismatic cell that surely insulates the external surface of its outer can, and to prevent a short circuit caused by dew condensation water.

The present invention of the prismatic cell to solve the above problem is characterized by a prismatic cell comprising an prismatic outer can having an opening at the top thereof, a sealing body for sealing the opening, and positive and negative electrode external terminals that are protruded from the sealing body and insulated from the sealing body, wherein the prismatic outer can is covered on side surfaces and the entire bottom with a piece of folded insulation sheet.

In this configuration, an insulative covering can be provided on an external surface of the outer can by using a simple technique.

The above configuration can be explained as follows. The bottom of the prismatic can is covered only by a piece of insulation sheet. The side surfaces of the prismatic outer can has a part covered with only one piece of the insulation sheet, and a part covered with multiple folded insulation sheet formed by folding the insulation sheet. And all edges of the insulation sheet are positioned above the bottom of the outer can.

In the above configuration, the bottom of the prismatic outer can is not covered with a folded part of the insulation sheet (the folded part is arranged on the side surface of the outer can). Therefore, since unevenness is not generated in the bottom of the outer can, height variation of the cell does not occur. Thereby, there can be prevented a poor contact of connecting members and a decrease in work efficiency during producing an assembled battery. In addition, since any of edges of the insulation sheet does not exist at the bottom into which water formed by dew condensation and so on tends to enter, it can be prevented that water enters into a gap between the insulation sheet and the edge thereof, or a gap between an overlapped portions of the edges of the insulation sheet. Thus, a short circuit due to condensation water can be prevented.

The edge of the insulation sheet used herein means an outline of the insulation sheet itself. In order to prevent condensed water from entering into the outer can through a gap of the insulation sheet, all edges of the insulation sheet are positioned preferably at or above ⅕, and more preferably at or above ⅓, of the height of the outer can (toward the opening side).

An area around the opening of the outer can does not have to be covered with an insulation sheet. In order to obtain a more reliable insulative function, the insulation sheet covers an area from the bottom preferably to ⅓ of the height of the outer can, more preferably to ½ of the height of the outer can, and still more preferably to 15 mm below the opening of the outer can.

In the above structure, the insulation sheet is composed of a heat welding film. And there is fixed by heat-welding at least an area with more overlaps near the boundary where the number of overlaps of the insulation sheet changes on the side surface of the prismatic outer can.

If the insulation sheet folded and overlapped multiple times is not fixed, it may harm the other operation. Therefore, it is preferable that the insulation sheet is adhered and fixed. There may be fixed the whole or a part of the area where the insulation sheet is overlapped multiple times. However, it is preferable to fix at least an area with a greater number of overlaps near the boundary where the number of overlap of the insulation sheet changes. More preferably, there is also fixed an area with a less number of overlaps near the boundary where the number of overlaps of the insulation sheet changes. As a fixing method, an adhesive agent, an adhesive tape, heat welding and the like may be used. From the viewpoint of easy operation, adhesion by heat welding is preferable. The insulation sheet folded and overlapped multiple times is fixed on the side surface of the outer can, preferably on the side surface having the largest area (the long side surface).

Figure 3:
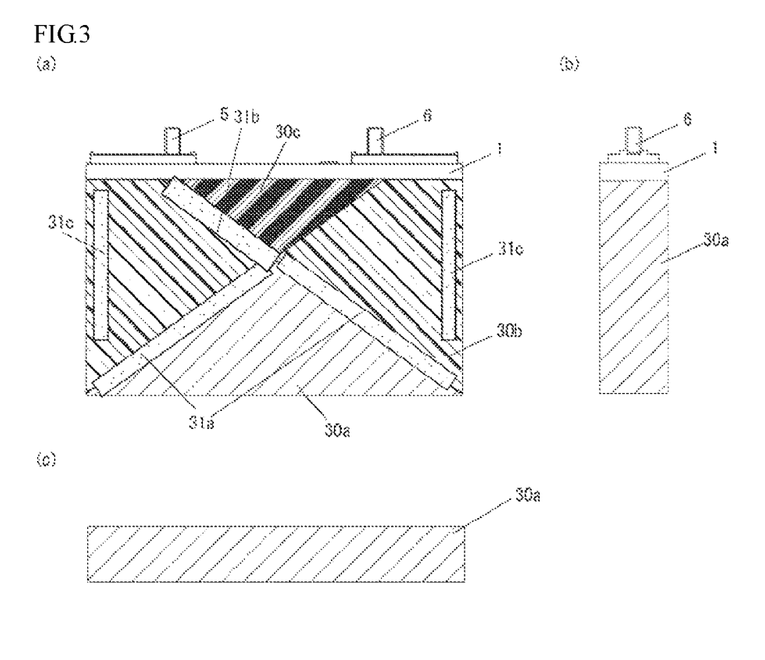
FIG. 3 is a diagram showing a prismatic cell according Embodiment 1 (after an insulation sheet is attached).

Using FIG. 3, there is explained the adhesive fixing and the boundary where the number of overlaps of the insulation sheet changes. This drawing shows that the side surface having the largest area (the long side surface) of the outer can contains a region 30a where the number of overlaps of the insulation sheet is one, a region 30b where the number of overlaps is three, and a region 30c where the number of overlaps is five. The short side surface and the bottom of the outer can have only the region 30a where the number of overlaps is one. Therefore, the change in the number of overlaps is found in the following boundaries: the boundary between the region 30a with one overlap and the region 30b with three overlaps in the long side surface; the boundary between the region 30b with three overlaps and the region 30c with five overlaps in the long side surface; and the boundary between the short side surface with one overlap and the long side surface with three overlaps. In each of these boundaries, the region with more overlaps is heat welded. FIG. 3 shows that the following parts are heat welded: a welding portion 31a formed by heat welding the boundary between the region 30a with one overlap and the region 30b with three overlaps in the long side surface; a welding portion 31b formed by heat welding the boundary between the region 30b with three overlaps and the region 30c with five overlaps in the long side surface; and a welding portion 31c formed by heat welding a part of the long side surface near the boundary between the short side surface and the long side surface.

When the heat welding is performed under the condition where a heat seal head used for the heat welding is located near a laser junction between the outer can and the sealing body, the laser junction may be damaged. For this reason, it is preferred that an area near the opening of the outer can (about 2 to 15 mm from the opening of the outer can) is not covered with an insulation sheet so that the heat seal head is not located near the laser junction between the sealing body and the outer can. Since such a problem does not occur in a case of an adhesive fixation other than heat welding, the entire side surfaces of the outer can may be covered with the insulation sheet in order to obtain reliable insulation.

Herein, the side surface of the outer can means, unless specifically limited, all four side surfaces except the bottom of the can. When only a side surface having the largest area is specified, the surface refers to as "a long side surface". Meanwhile, when only the other side surface is specified, the surface refers to as "a short side surface".

It is preferable to use polyolefin such as polyethylene and polypropylene, polystyrene or polyester as a heat welding film because they are inexpensive and excellent in electrical insulation and workability.

The present invention of the method for manufacturing a prismatic cell to solve the above problems is characterized as follows. The method is for manufacturing a prismatic cell that comprise: a prismatic outer can having an opening at the top thereof; a sealing body for sealing the opening; and positive and negative electrode external terminals that are protruded from the sealing body and insulated from the sealing body, wherein the method comprises an insulation sheet covering step for folding a piece of insulation sheet to cover side surfaces and the entire bottom of the prismatic outer can.

In this configuration, an insulative covering can be provided on an outer surface of the outer can by using the simple technique.

In the above configuration, the insulation sheet may be rectangular, and the insulation sheet covering step may include the following steps: an arranging step for arranging the prismatic outer can in the center of the insulation sheet so that each side of the bottom of the outer can is parallel to each side of the rectangular insulation sheet; a fold step for folding the insulation sheet from the bottom to the four side surfaces; and a fixing step of the insulation sheet in which a part of the insulation sheet not covering the outer can is folded toward the side surface having the largest area of the prismatic outer can and then at least the region with more overlaps is adhered and fixed near the boundary where the number of overlaps of the insulation sheet changes in the side surface of the outer can.

When the prismatic outer can is arranged in the center of the rectangular insulation sheet so that each side of the bottom of the outer can is parallel to each side of the insulation sheet, and when the insulation sheet is folded in the above way, overlaps and edges of the insulation sheet can be positioned in the long side surface separately from the bottom (at a position where a height of the cell is not influenced and dew condensation water hardly enters). This prevents an increase in the cell height and a short circuit due to dew condensation water.

In the above configuration, the insulation sheet may be composed of a heat-welding film, the adhesive fix is heat welding, and four corners of the insulation sheet are cut off.

Four corners of the rectangular insulation sheet is not a part directly covering the side surfaces and bottom of the outer can, but a part where multiple insulation sheets are overlapped by folding them. Therefore, even if this part is cut-off, insulation and covering are not influenced. In addition, the cut-off of the four corners prevents the overlap portions of the insulation sheet from being further overlapped and from being close to each other. If excess thermal energy acts during thermal welding, an electrode assembly and an electrolyte solution housed in the outer can may be thermally damaged. In addition, when the overlap portions of the insulation sheet are further overlapped, a great deal of thermal energy is required for heat-welding this part. Meanwhile, when the overlap portions of the insulation sheet are close to each other, excess thermal energy is applied because of thermal application to the same site more than once. However, the above configuration can prevent the thermal damage of the electrode assembly and the electrolyte.

Figure 7:
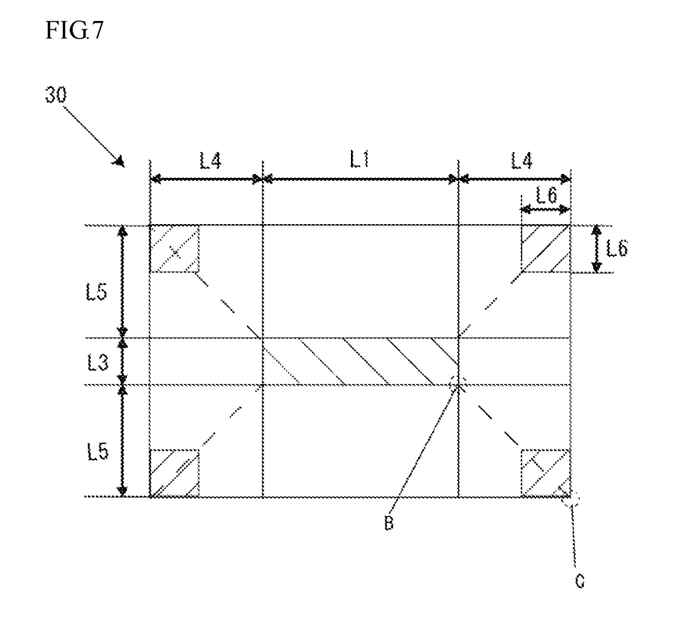
FIG. 7 is a diagram showing an insulation sheet used in the present invention.

Here, the rectangular insulation sheet for covering the outer can is explained with reference to FIG. 7. The width of the outer can (the long side of the bottom of the outer can), the height of the outer can and the thickness of the outer can (the short side of the bottom of the outer can) are defined as $L1$, $L2$ and $L3$, respectively. In this case, the central region of the insulation sheet 30 (the area of right-down diagonal lines) is fitted to the bottom of the outer can. In this drawing, the area extending vertically from the central region covers the long side surfaces of the outer can, while the area extending laterally from the central region covers the short side surfaces of the outer can. In addition, the four residual corner areas are folded along the dashed lines in FIG. 7, then folded toward the long side surface, and fixed on the long side surface. In this configuration, when the width of the insulation sheet 30 (the length of the side parallel to the short side of the bottom of the outer can) is set to $L3+2L5$, and when the length of the insulation sheet 30 (the length of the side parallel to the long side of the bottom of the outer can) is set to $L1+2L4$, it is preferable that the following formulas are satisfied: $(L2)/3 \le L4 \le L2$, and $(L2)/3 \le L5 \le L2$. And $L4$ and $L5$ may be the same value or may be different. Additionally, when the corners of the insulation sheet 30 is cut off, it is preferable that the following formula is satisfied: $L4-(L1)/2 < L6 \le (L4)/2$, wherein $L6$ is the length of the cut-off region.

The present invention relating to the above prismatic cell and the method of manufacturing the prismatic cell can be configured so that an adhesive layer is provided at least on a part of the insulation sheet on the side in contact with the outer can.

When an adhesive layer is provided at least on a part of the insulation sheet on the side in contact with the outer can, the insulation sheet and the outer can are adhered via the adhesive layer, and thereby the workability of covering the outer can with the insulation sheet can be improved. In addition, after covering the outer can with the insulation sheet, it is possible to prevent removal of the insulation sheet from the prismatic cell and dislocation of the insulation sheet.

In the case that an adhesive layer is provided on the surface of the insulation sheet in contact with the outer can, the adhesive layer is preferably provided at least at the upper end (the end of the opening side of the outer can) of the insulation sheet, which is contacted with the side surface having the largest area (the long side surface) of the outer can. In addition, it is more preferable to provide an adhesive layer over the whole of the part of the insulation sheet, which is contacted with the outer can.

When a piece of insulation sheet is folded to cover the bottom and side surfaces of the prismatic outer can, the upper end (the end of the opening side of the outer can) of the insulation sheet which covers the long side surface of the outer can may often be separated from the outer can without the contact, leading to deflections of the insulation sheet. In such a case, a gap occurs between the long side surface of the outer can and the upper end of the insulation sheet covering the long side surface of the outer can, and thus the following problems may be caused.

In fabrication of an assembled battery, multiple prismatic cells are arrayed via a spacer so that each of the long side surfaces of the prismatic cells faces one another, and then the arrayed prismatic cells are bound together. When the insulation sheet covering the long side surface of the outer can is deflected without the contact to the outer can, the deflected insulation sheet is pressed against the long side surface of the outer can, wrinkles are generated in the insulation sheet covering the long side surface of the outer can. This causes a variation in thickness of each prismatic cell, thus leading to a connection failure and a decrease in work efficiency during the fabrication of the assembled battery.

Figure 5:
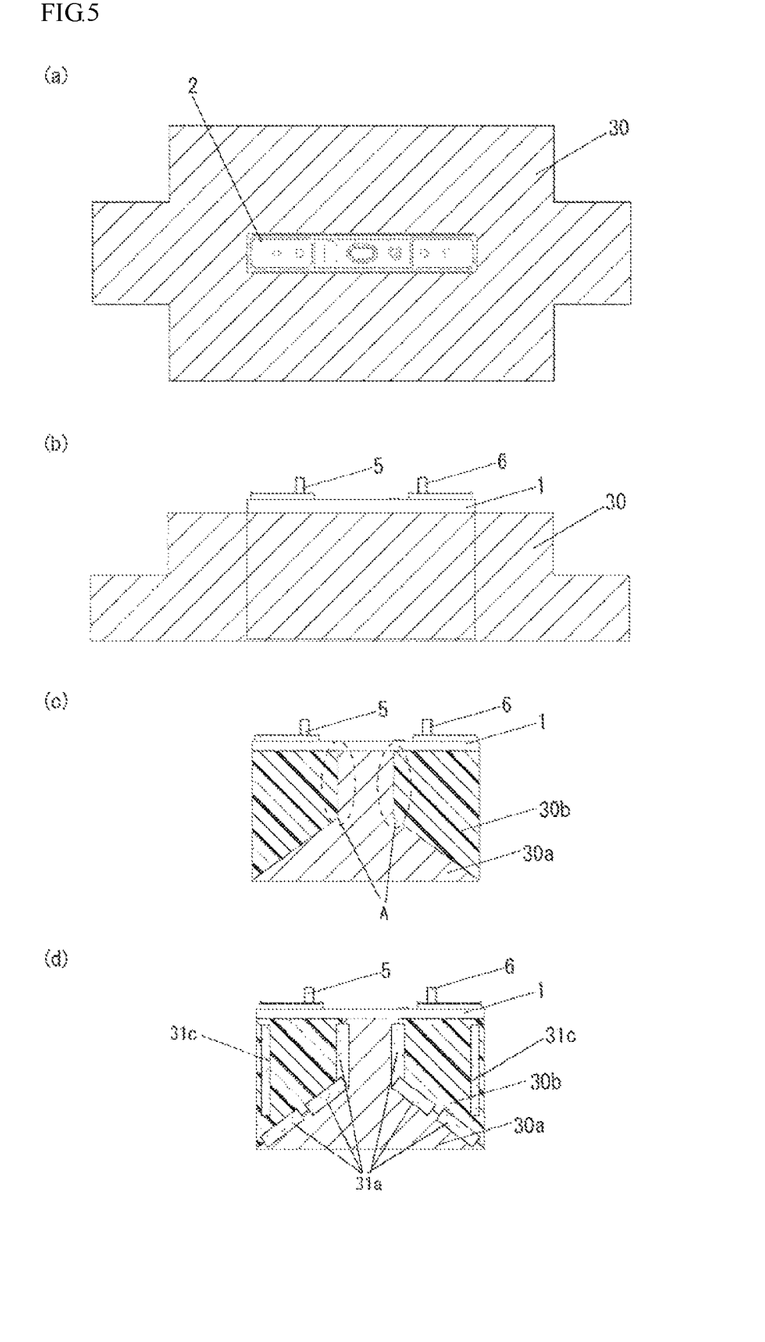

When there is a gap between the long side surface of the outer can and the upper end (the end of the opening side of the outer can) of the insulation sheet covering this long side surface of the outer can, water caused by dew condensation may enter into the gap between the outer can and the insulation sheet. For example, as shown in FIG. 5, when the outer can is covered with a rectangular insulation sheet with its four corners cut off, and when there exists a part where the edges of the insulation sheet are overlapped in the height direction of the outer can, then the presence of water between the outer can and the insulation sheet may cause a short circuit between the prismatic cells.

Specifically, a short circuit may occur since a closed loop is formed as follows: [Inside of the cell] positive electrode/electrolyte/outer can→[Outside of the cell] outer can/water between the insulation sheet and the outer can/water between the adjacent insulation sheets/water membrane of the insulation sheet on the external surface of the cells→water that had accumulated on the floor (or a floor made of metal)→water membrane of the insulation sheet on the external surface of the cells→water between the adjacent insulation sheets/water between the insulation sheet and the outer can/outer can→[Inside of the cell] outer can/electrolyte/negative electrode→negative electrode/negative electrode external terminal/a busbar (a connecting member)/positive electrode external terminal/positive electrode.

Such a short circuit may occur in the case that the overlap between the edges of the insulation sheet is positioned lower than the upper end (the end of the opening side of outer the can) of the insulation sheet directly covering the outer can.

When the configuration is adopted in which the adhesive layer is provided at least at the upper end of the contact part of the insulation sheet with the long side surface of the outer can, the long side surface of the outer can may be adhered to the upper end of the part in which the insulation sheet covers the long side surface of the outer can. Therefore, since it can be prevented that a gap causes between the outer can and the upper end of the part in which the insulation sheet covers the long side surface of the outer can, it becomes less possible that the above problem occurs.

As an adhesive agent constituting the adhesive layer, there can be used a rubber-based adhesive, an acrylic-based adhesive, a silicon-based adhesive, and a urethane-based adhesive. In addition, solvents, additives and the like in addition to the adhesive agent may be also contained in the adhesive layer.

Figure 9:
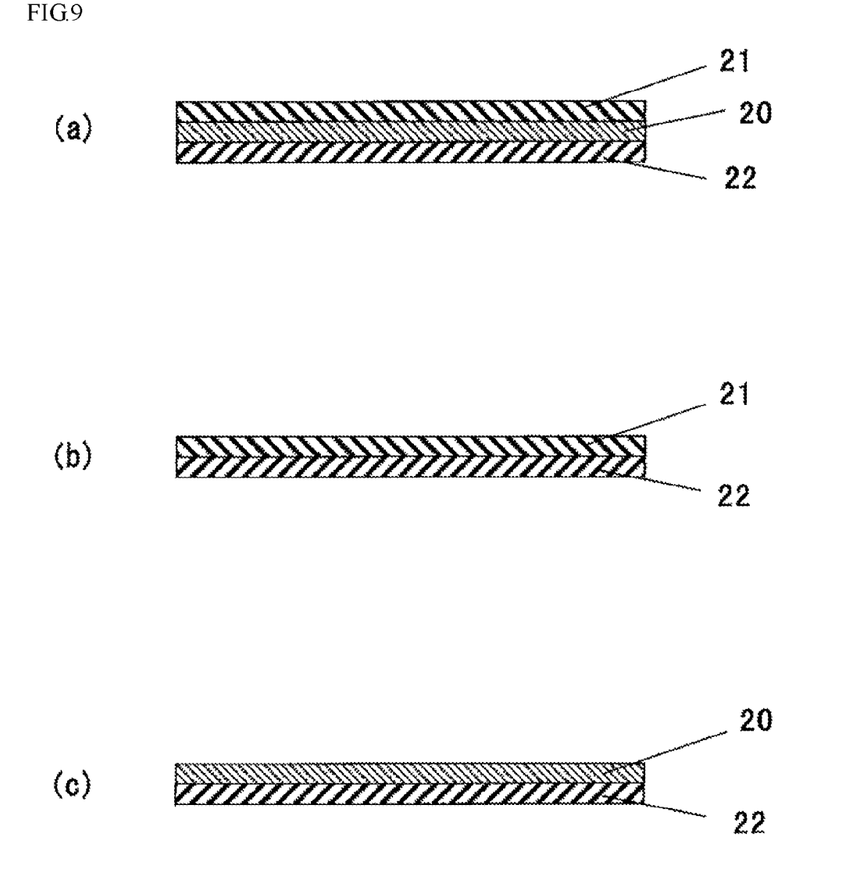
FIG. 9 shows a cross section of an insulation sheet equipped with an adhesive layer.

The insulation sheet equipped with an adhesive layer is explained using FIG. 9. When an insulation sheet is equipped with an adhesive layer, there may be used a sheet in which a heat welding layer 21 is provided on one side of a base material 20 and an adhesive layer 22 is provided on the other side (FIG. 9 (a)). Also, there can be used a sheet consisting of a heat welding layer 21 and an adhesive layer 22 (FIG. 9 (b)). Otherwise, there can be also used a sheet in which an adhesive layer 22 is provided on one side of a base material 20 (FIG. 9 (c)). As the heat welding layer 21, polyolefins such as polyethylene and polypropylene, polystyrene or polyester can be used. As the base material, polypropylene-base resin, polystyrene-base resin, polyethylene-base resin, acrylic resin, fluororesin, vinyl resin and the like can be used.

The present invention of an assembled battery to solve the above problems relates to an assembled battery composed of a plurality of the prismatic cells according to the above invention.

The assembled battery composed of the prismatic cells with having the above configuration can prevent a short circuit, a connection failure and so on.

BRIEF DESCRIPTION OF DRAWINGS

FIG. 3(a) is a front view, FIG. 3(b) is a side view, and FIG. 3(c) is a bottom view.

FIG. 4 (a) is a front view, FIG. 4 (b) is a side view, and FIG. 4 (c) is a bottom view.

FIGS. 5 (a) through (d) are diagrams explaining an attachment process of the insulation sheet.

FIGS. 6 (a) through (b) are diagrams showing a modified example of a shape of a cut-off area in the insulation sheet.

FIG. 8(a) is a front view, and FIG. 8(b) is a bottom view.

FIG. 9 (a) is a cross section of an insulation sheet composed of a heat-welding layer/a base material/an adhesive layer. FIG. 9 (b) is a cross section of an insulation sheet composed of a heat-welding layer/an adhesive layer. FIG. 9 (c) is a cross section of an insulation sheet composed of a base material/an adhesive layer.

FIGS. 10(a) and (b) show a rectangular insulation sheet. And FIGS. 10(c) and (d) show a rectangular insulation sheet with the four corners cut off.

DESCRIPTION OF THE CODE

1 Outer can
2 Sealing body
5,6 Electrode terminal
10 Electrode assembly
11 Positive electrode
12 Negative electrode
14 Positive electrode current collector plate
15 Negative electrode current collector plate
20 Base material
21 Heat welding layer
22 Adhesive layer
30 Insulation sheet
31 Welding portion
40 Heat shrinkable tube
41 Welding portion

DETAILED DESCRIPTION OF THE INVENTION

Embodiment 1

Figure 1:
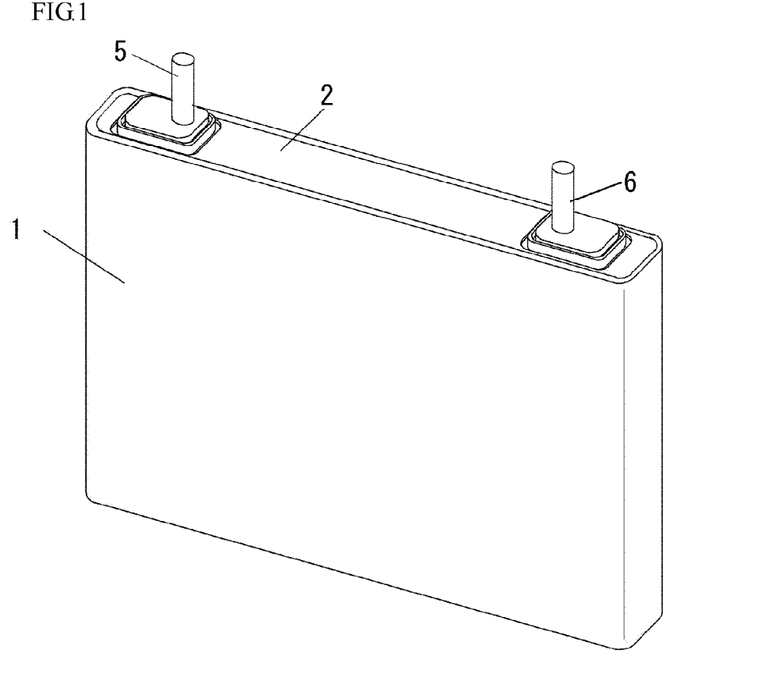
FIG. 1 shows a perspective view of a prismatic cell according to Embodiment 1 (before an insulation sheet is attached).
Figure 2:
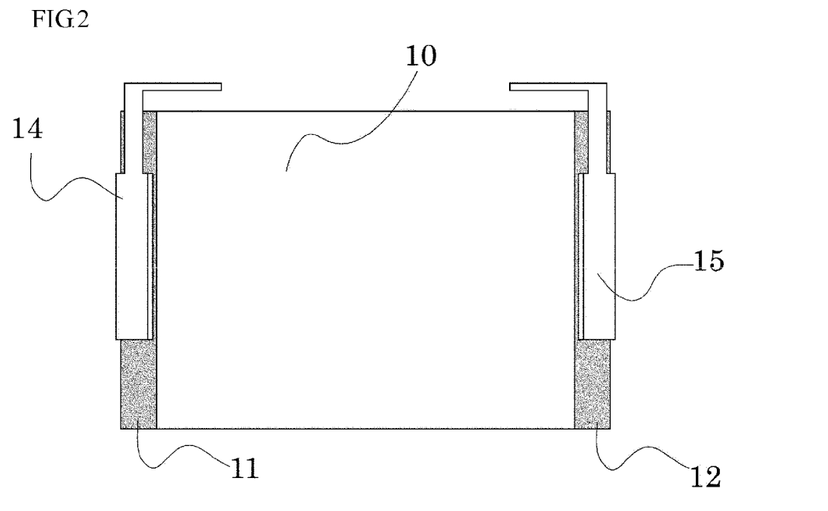
FIG. 2 is a diagram showing an electrode assembly according to Embodiment 1.

There is explained below a case of applying the prismatic cell according to the present invention to a lithium ion secondary cell with reference to the drawings. FIG. 1 shows a perspective view of a prismatic cell according to Embodiment 1 (before the insulation sheet is attached). FIG. 2 is a diagram showing an electrode assembly used in a lithium ion secondary cell. And FIG. 3 is a diagram showing a lithium ion secondary cell according to Embodiment 1 (after the insulation sheet is attached).

As shown in FIG. 1, the lithium ion secondary cell according to this Embodiment comprises a prismatic outer can 1 having an opening, a sealing body 2 for sealing the opening of the outer can 1, and positive and negative electrode external terminals 5 and 6 protruding from the sealing body 2 to the outside.

An electrode assembly 10 is formed by wounding a positive electrode 11 and a negative electrode 12 via a separator of a microporous membrane made of polyethylene. As shown in FIG. 2, a positive electrode collector plate 14 is attached to a core exposed portion in which an active material layer is not formed in the positive electrode 11 of the electrode assembly 10, and a negative electrode collector plate 15 is attached to a core exposed portion in which an active material layer is not formed in the negative electrode 12.

This electrode assembly 10 in addition to a non-aqueous electrolyte is housed in the above outer can 1, and is configured so that the positive and negative electrode current collector plates 14 and 15 are electrically connected to the electrode external terminals 5 and 6, respectively, that are protruded from the sealing body 2 and insulated from the sealing body 2, and thereby the current is extracted outside.

As shown in FIG. 3, the exterior surface of the lithium ion secondary cell can according to this Embodiment is covered by folding an insulation sheet composed of a piece of rectangular heat-welding film (no adhesive layer). The short side surface (cf. FIG. 3(b)) and bottom (cf. FIG. 3(c)) of the outer can are covered with (a piece of) the insulation sheet that is not overlapped (30a). Meanwhile in the long side surface, there are an area 30a covered by a piece of the insulation sheet, an area 30b where three pieces of the insulation sheet are overlapped, and an area 30c where five pieces of the insulation sheet are overlapped. And a welding portion 31 fixed by heat welding is formed at least in the region with more overlaps near the boundary where the number of overlaps of the insulation sheet changes. In this Embodiment, the following welding portions are formed: a welding portion 31a formed by heat-welding the boundary between the region 30a with one overlap and the region 30b with three overlaps in the long side surface; a welding portion 31b formed by heat-welding the boundary between the region 30b with three overlaps and the region 30c with five overlaps in the long side surface; and a welding portion 31c formed by heat-welding a part of the long side surface near the boundary between the short side surface with one overlap and the long side surface with three overlaps.

Embodiment 2

Figure 4:
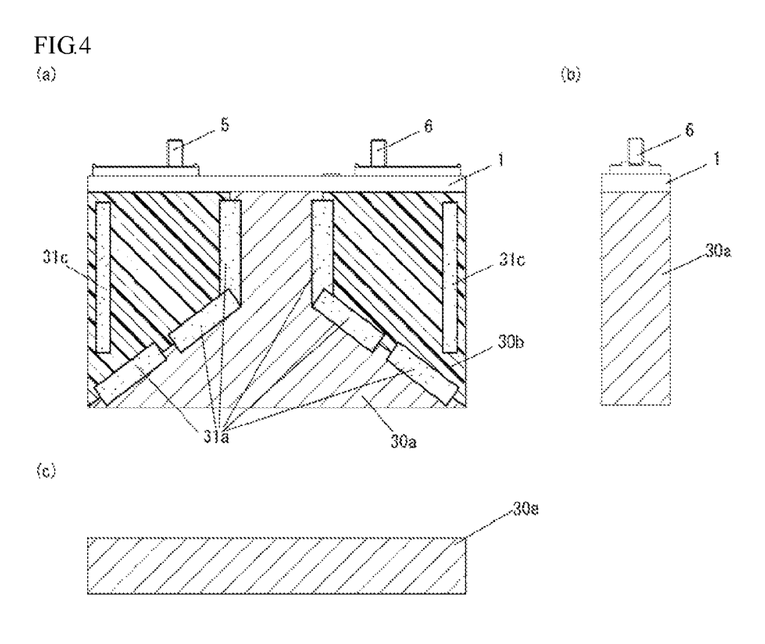
FIG. 4 is a diagram showing the prismatic cell according to Embodiment 2 (after an insulation sheet is attached).

FIG. 4 shows a front view of a prismatic cell according to this Embodiment. As the insulation sheet, as shown as 30 in FIG. 5(a), there is used a rectangular heat-welding film (without an adhesive layer) with the four corners cut off. The prismatic cell according to this Embodiment is the same as the cell according to Embodiment 1 except that, as shown in FIG. 4(a), an overlap portion of the insulation sheet 30 folded toward the long side surface is not overlapped with another overlap portion thereof, and therefor there is neither a region where the number of overlaps is five in the long side surface (30c in FIG. 3) nor a welding portion 31b formed by heat-welding the boundary between the region 30b with three overlaps and the region 30c with five overlaps in the long side surface.

Embodiment 3

Figure 10:
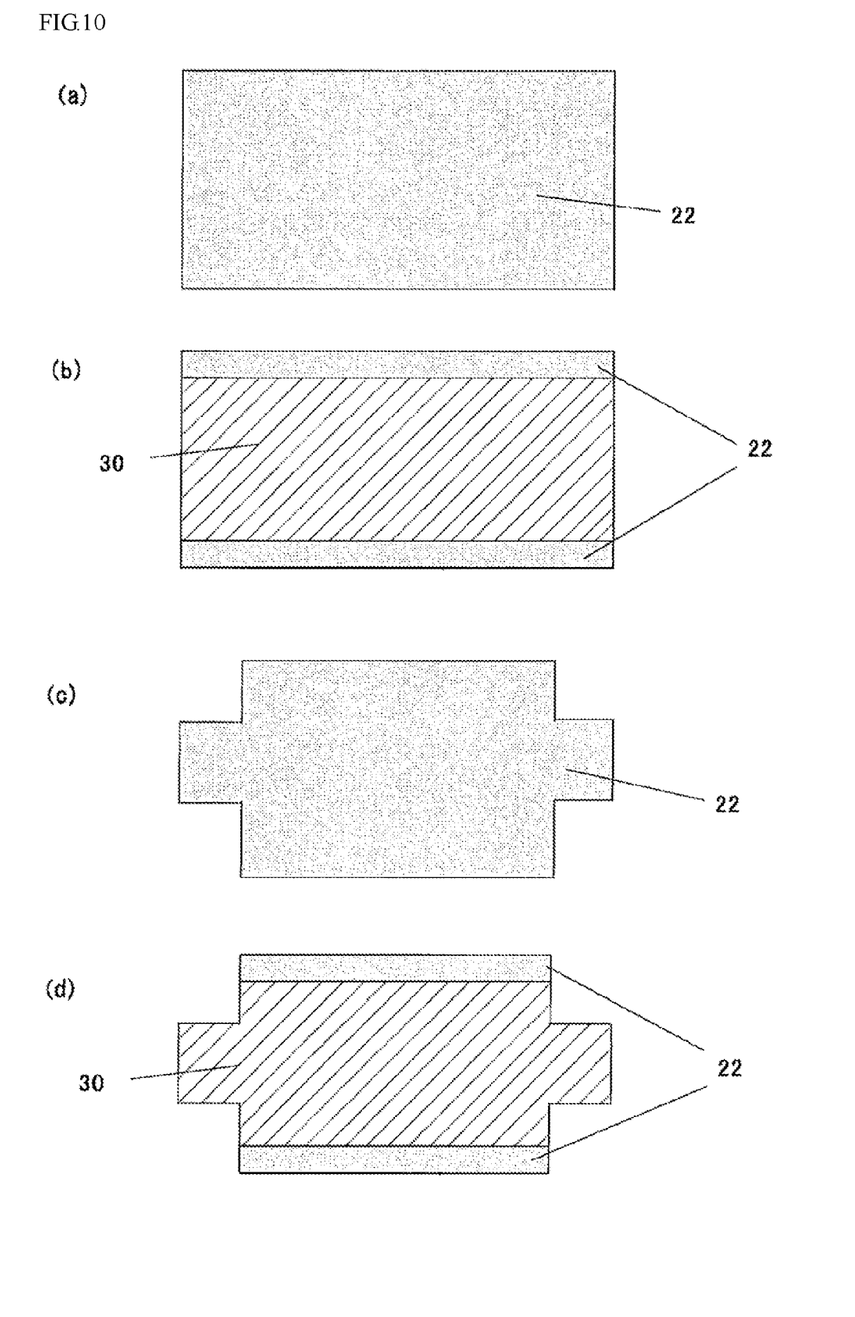
FIG. 10 shows a drawing of the insulation sheets having an adhesive layer according to Embodiments 3 to 6 when viewed from the side contacted with the outer can.

As shown in FIG. 10(a), Embodiment 3 is similar to Embodiment 1 except that there is used a insulation sheet in which an adhesive layer 22 is provided over the entire surface of one side of the insulation sheet 30 formed of a rectangular heat-welding film. The outer can 1 is covered with the insulation sheet 30 so that the adhesive layer 22 provided on the insulation sheet 30 is contacted with the outer can 1.

Embodiment 4

As shown in FIG. 10(b), Embodiment 4 is similar to Embodiment 1 except that there is used a insulation sheet in which an adhesive layer 22 is provided at a pair of opposite edges of one side of the insulation sheet 30 formed of a rectangular heat-welding film. The outer can 1 is covered with the insulation sheet 30 so that the adhesive layer 22 provided on the insulation sheet 30 is contacted with the outer can 1. The area where the adhesive layer 22 is provided is corresponding to the upper end of the overlap portion of the insulation sheet 30 with the long side surface of the outer can 1 (the end of the opening side of the outer can).

Embodiment 5

As shown in FIG. 10(c), Embodiment 5 is similar to Embodiment 2 except that there is used a insulation sheet in which the four corners of the insulation sheet 30 formed of a rectangular heat-welding film are cut off and an adhesive layer 22 is provided over the entire surface of one side. The outer can 1 is covered with the insulation sheet 30 so that the adhesive layer 22 provided on the insulation sheet 30 is contacted with the outer can 1.

Embodiment 6

As shown in FIG. 10(d), Embodiment 6 is similar to Embodiment 2 except that there is used a insulation sheet in which four corners of the insulation sheet 30 formed of a rectangular heat-welding film are cut off and an adhesive layer 22 is provided at a pair of opposite edges of one surface. The outer can 1 is covered with the insulation sheet 30 so that the adhesive layer 22 provided on the insulation sheet 30 is contacted with the outer can 1. The area covered with the adhesive layer 22 is corresponding to the upper end of the overlap portion of the insulation sheet 30 with the long side surface of the outer can 1 (the end of the opening side of the outer can).

Using the configuration according to Embodiment 2 as an example, there is explained a method for preparing the lithium ion secondary cell having the above structure.

<Preparation of the Positive Electrode>

A positive electrode active material of lithium cobalt oxide ($LiCoO_2$), a carbon-based conductive agent such as acetylene black and graphite, and a binder of polyvinylidene fluoride (PVDF) are weighed at a mass ratio of 90:5:5. Then, these are dissolved in an organic solvent such as N-methyl-2-pyrrolidone and mixed to prepare a positive electrode active material slurry.

Next, using a die coater, a doctor blade or the like, the positive electrode active material slurry is applied in a uniform thickness on both sides of a positive electrode core made of a strip-like aluminum foil (20 µm thick). However, the slurry is not applied at one end (an end in the same direction on both surfaces) along the longitudinal direction of the positive electrode core to expose the core and to form a positive electrode core exposed portion.

Then, the plate is passed through a dryer and the organic solvent is removed to prepare a dried electrode plate. This dried electrode plate is rolled using a rolling press to prepare a positive electrode plate. The positive electrode plate thus prepared is cut to a predetermined size to obtain a positive electrode.

As a positive electrode active material for the lithium ion secondary cell according to this Embodiment, there can be used alone or in combination, in addition to the above-mentioned lithium cobalt oxide, lithium containing transition metal composite oxide such as lithium nickel oxide ($LiNiO_2$), lithium manganese oxide ($LiMn_2O_4$), olivine-type lithium iron phosphate ($LiFePO_4$), or an oxide in which a transition metal contained in the above oxides is partially substituted with another element.

<Preparation of the Negative Electrode>

A negative electrode active material of artificial graphite with a volume average particle size of 20 µm, a binder of a styrene-butadiene rubber, and a thickening agent of carboxymethylcellulose are weighed in a mass ratio of 98:1:1. Then, these are mixed with an appropriate amount of water to prepare a negative active material slurry.

Next, using a die coater, a doctor blade or the like, the negative electrode active material slurry is applied in a uniform thickness on both sides of a negative electrode core made of a strip-like copper foil (12 µm thick). However, the slurry is not applied at one end (an end in the same direction on both surfaces) along the longitudinal direction of the negative electrode core to expose the core and to form a negative electrode core exposed portion.

Then, the plate is passed through a dryer and water is removed to prepare a dried electrode plate. This dried electrode plate is rolled using a rolling press to prepare a negative electrode plate. The negative electrode plate thus prepared is cut to a predetermined size to obtain a negative electrode.

As a negative electrode material used in the lithium ion secondary cell according to this Embodiment, there can be used, for example, a carbonaceous material such as natural graphite, carbon black, coke, glassy carbon, carbon fiber, and fired products thereof, or a mixture of the above carbonaceous material with at least one selected from the group consisting of lithium, lithium alloys, and metal oxides that can intercalate and deintercalate lithium.

<Preparation of the Electrode Assembly>

The positive electrode, the negative electrode, and a separator made of a microporous polyethylene membrane are positioned so that a plural of core exposed portions of the same electrode are overlapped, the core exposed portions of one electrode protrude toward the opposite side to those of the other electrode relative to the direction of winding, and the separator is interposed between different active material layers. Then, these three components are laminated and wound using a winder, and then an insulation winding-end tape is attached. Thereafter, the wound member is pressed to complete a flat electrode assembly.

<Connection with the Collector Plate and the Sealing Body>

There are prepared an aluminum positive electrode current collector plate 14 and a copper negative electrode current collector plate 15 which respectively have two protrusions (not shown) protruding to one side and positioned separately. In addition, there are prepared two aluminum positive electrode current collector plate receiving members (not shown) and two copper negative electrode current collector plate receiving members (not shown) which respectively have a protrusion projecting to one side. Then, an insulation tape is applied so as to surround the respective protrusions of the positive electrode current collector plate 14, the negative electrode current collector plate 15, the positive electrode current collector plate receiving members, and the negative electrode current collector plate receiving members.

Gaskets (not shown) are disposed in an inner surface of a through hole (not shown) provided in the sealing body 2, and disposed in the outer surface of the cell around the through hole. An insulating member (not shown) is disposed in the inner surface of the cell around the through hole provided in the sealing body 2. Then, the positive electrode current collector plate 14 is positioned on the insulating member disposed on the cell inner surface of the sealing body 2 so that the through hole of the sealing body 2 may be overlapped with a through hole (not shown) formed in the collector plate. Thereafter, an insertion portion (not shown) in the positive electrode external terminal 5 having a flange (not shown) and the insertion portion is inserted from outside of the cell into the through holes of the sealing body 2 and the collector plate. In this state, a diameter of the lower part (the cell inner side) of the insertion portion is expanded, and thereby the positive electrode external terminal 5 and the positive electrode current collector plate 14 are caulked and fixed to the sealing body 2.

Also in the negative electrode, the negative electrode external terminal 6 as well as the negative electrode collector plate 15 are caulked and fixed to the sealing body 2. These operations integrate the respective members, and the positive and negative electrode current collector plates 14 and 15 are conductively connected to the positive and negative electrode external terminals 5 and 6, respectively. In addition, the positive and negative electrode external terminals 5 and 6 are protruded from and insulated from the sealing body 2.

<Attachment of the Current Collector Plate>

The positive electrode current collector plate 14 is disposed on one surface of the core exposed portion in the positive electrode 11 of the flat electrode assembly so that the protrusions of the positive electrode current collector plate 14 are opposed to the positive electrode core exposed portion. One of the positive electrode current collector plate receiving members is disposed so that its protrusion is opposed to the positive electrode core exposed portion, and so that one of the protrusions of the positive electrode current collector plate 14 is opposed to the protrusion of the positive electrode current collector plate receiving members. Thereafter, a pair of welding electrodes are attached to the back of the protrusion of the positive electrode current collector plate 14 and the back of the protrusion of the positive electrode current collector plate receiving member, respectively. Then, electric current is flowed to the pair of welding electrodes in order to resistance weld the positive electrode current collector plate 14 and the positive electrode current collector plate receiving member to the positive electrode core exposed portion.

Next, the other one of the positive electrode current collector plate receiving members is disposed so that its protrusion is opposed to the positive electrode core exposed portion, and so that the other one of the protrusions of the positive electrode current collector plate 14 is opposed to the protrusion of the positive electrode current collector plate receiving members. Thereafter, a pair of welding electrodes are attached to the back of the protrusion of the positive electrode current collector plate 14 and the back of the protrusion of the positive electrode current collector plate receiving member, respectively. Then, electric current is flowed to the pair of welding electrodes in order to perform a second resistance welding. With these operations, the positive electrode current collector plate 14 and the positive electrode current collector plate receiving members are fixed to the positive electrode core exposed portion.

Also in the negative electrode 12, the negative electrode current collector plate 15 and the negative electrode collector plate receiving member are resistance welded.

<Preparation of the Electrolyte Solution>

Ethylene carbonate (EC), propylene carbonate (PC) and diethyl carbonate (DEC) are mixed in the volume ratio of 1:1:8 (conversion at 1 atm and 25° C.), and then $LiPF_6$ as an electrolyte salt is dissolved in this mixed non-aqueous solvent at 1.0M (mol/l) to prepare an electrolyte solution.

A non-aqueous solvent used in the lithium ion secondary cell according to this Embodiment is not limited to the above combination. For example, there can be used a mixture of a low viscosity solvent and a high dielectric solvent having high solubility of a lithium salt. The high dielectric solvent includes ethylene carbonate, propylene carbonate, butylene carbonate, and γ-butyrolactone. And the low viscosity solvent includes diethyl carbonate, dimethyl carbonate, ethyl methyl carbonate, 1,2-dimethoxyethane, tetrahydrofuran, anisole, 1,4-dioxane, 4-methyl-2-pentanone, cyclohexanone, acetonitrile, propionitrile, dimethylformamide, sulfolane, methyl formate, ethyl formate, methyl acetate, ethyl acetate, propyl acetate, and ethyl propionate. In addition, there can be also used two or more of the high dielectric solvents or the low viscosity solvents, respectively. As the electrolyte salt, in addition to above $LiPF_6$, $LiN(C_2F_5SO_2)_2$, $LiN(CF_3SO_2)_2$, $LiClO_4$, $LiBF_4$ and the like can be used alone or a mixture of two or more.

<Cell Assembly>

The electrode assembly 10 integrated with the sealing body 2 is inserted into the outer can 1. Then, the sealing body 2 is fitted to the opening of the outer can 1, and a joint of a circumference of the sealing body 2 and the outer can 1 are laser welded. After injecting a predetermined amount of the electrolyte solution from an electrolyte injection hole (not shown) provided in the sealing body 2, the electrolyte injection hole is sealed.

<Attachment of the Insulation Sheet>

As shown in FIG. 5(a), the above prismatic cell is positioned at the center of the rectangular insulation sheet 30 made of polypropylene and cut off at its four corners so that each side of the bottom of the outer can 1 is parallel to each side of the insulation sheet 30.

The insulation sheet 30 is folded toward the long side surface of the outer can (cf. FIG. 5 (b)).

Next, the insulation sheet 30 is folded toward the short side surface of the outer can. At this point, a portion of the insulation sheet not covering the outer can is folded along a line (cf. the dashed line in FIG. 7) from a point (Point B in FIG. 7) in contact with a corner of the bottom of the outer can toward a corner (Point C in FIG. 7) of the rectangular insulation sheet without a cut-off. This fold line is a bisector of an angle between extended lines of the long side and the short side of the bottom of the outer can. Thereafter, the portion not covering the outer can is folded toward the long side surface of the outer can (cf. FIG. 5 (c)).

The insulation sheet 30 may be folded toward the short side surface of the outer can, and then folded toward the long side surface of the outer can. In this case, when the insulation sheet 30 is folded toward the long side surface of the outer can, the insulation sheet is folded along a line (cf. the dashed line in FIG. 7) from a point (Point B in FIG. 7) in contact with a corner of the bottom of the outer can toward a corner (Point C in FIG. 7) of the rectangular insulation sheet without a cut-off. Thereafter, the portion not covering the outer can is folded toward the long side surface of the outer can.

The heat welding is performed near the boundary where the number of overlaps of the insulation sheet changes (the boundary between the region 30a with one overlap and the region 30b with three overlaps in the long side surface; and a part of the long side surface near the boundary between the long side surface with three overlaps and the short side surface with one overlap), thus forming welding portions 31a and 31c (cf. FIG. 5(d)). Thereby, a lithium ion secondary cell according to this Embodiment is completed.

In this configuration, the overlap portion between edges of the insulation sheet, into which dew condensation water may enter, is located above the bottom of the outer can (an opening side). Therefore, it can be prevented that dew condensation water that accumulates on the floor to place the cell enters into the outer can from the gap between the edges of the insulation sheet.

In order to prevent dew condensation water from entering the outer can from the gap of the insulation sheet, the lower end of the overlap area where the edges of the insulation sheet are overlapped (the area A enclosed by dashed line in FIG. 5(c)) is positioned preferably at or above ⅕, and more preferably at or above ⅓, of the height of the outer can from the bottom.

When the edges of the insulation sheet do not fully overlapped with each other, each of the edges of insulation sheet must be positioned above the bottom of the outer can. Also in this case, each of the edges of insulation sheet is positioned preferably at or above ⅕, and more preferably at or above ⅓, of the height of the outer can from the bottom.

In an example shown in FIG. 4, an area near the opening of the outer can 1 (an area within 15 mm from the opening) is not covered with an insulation sheet 30, and thus the outer can 1 is exposed in the area. This is to prevent damage to a laser joint between the outer can 1 and the sealing body 2 due to a heat seal head.

Comparative Embodiment

Figure 8:
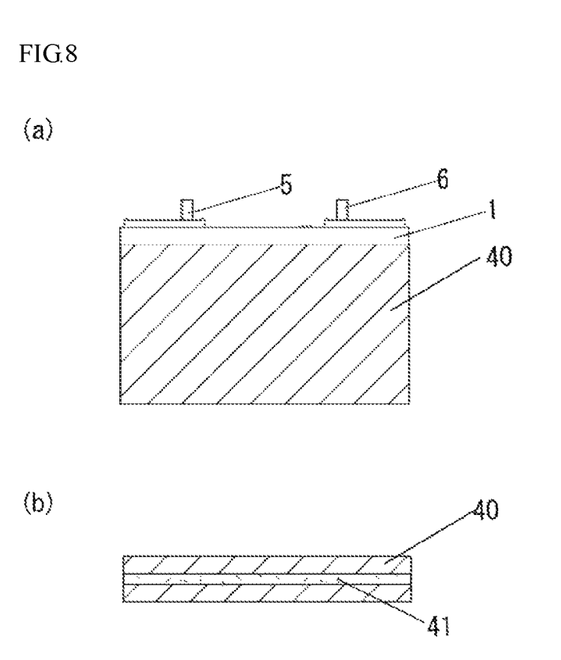
FIG. 8 is a diagram showing a prismatic cell according to Comparative Embodiment.

A prismatic cell according to Comparative Embodiment is show in FIG. 8. The prismatic cell according to Comparative Embodiment is similar to that in above Embodiment 1 except that the prismatic cell is inserted into a polyolefin heat shrinkable tube, the heat shrinkable tube 40 is heated and shrunk using a dryer to be closely attached to a prismatic outer can 1 of the cell, and then an edge of the bottom of the heat shrinkable tube is heat welded at the bottom of the outer can to form a welding portion 41. In Comparative Embodiment, the heat shrinkable tube is not overlapped in the side surface of the outer can, and the end of the heat shrinkable tube are folded in the bottom of the can.

In the configuration of Comparative Embodiment, there is a folding on the bottom of the outer, resulting in an unevenness of the bottom. In contrast, in the configuration of Embodiments 1 and 2, since there is no folding in the bottom of the outer can (the folding is located on the side surface), an unevenness cannot be formed on the bottom. Thus, the configuration according to Embodiments 1 and 2 allows to prevent an increase in cell height, and to significantly reduce the height variation in the cell.

In the configuration of Comparative Embodiment, since the heat-welding portion of the welding tube is formed on the bottom of the outer can, when the thermal welding is insufficient, a gap is generated in the heat-welding portion. Thus, dew condensation water created in the floor where the cell is placed penetrates from this gap, which may cause a short circuit due to the dew condensation water. In contrast, in the configuration of Embodiments 1 to 6, since all edges of the insulation sheet are positioned on the long side surface of the outer can above the bottom (cf. FIGS. 3 and 4), a short circuit due to dew condensation water hardly occurs.

In the configuration of Embodiments 2, 5 and 6, unlike Embodiments 1, 3 and 4, there is not a region 30c where five pieces of the insulation sheet are overlapped in the long side surface. Therefore, when a boundary where the number of folded pieces changes is heat welded, it can be prevented that heat repeatedly acts on the same place, thus decreasing heat damage.

Supplementary Remarks

The invention is not limited to the lithium ion secondary cell, and may be applied to other prismatic cells such as a nickel-hydrogen rechargeable cell and a nickel-cadmium rechargeable cell.

Figure 6:
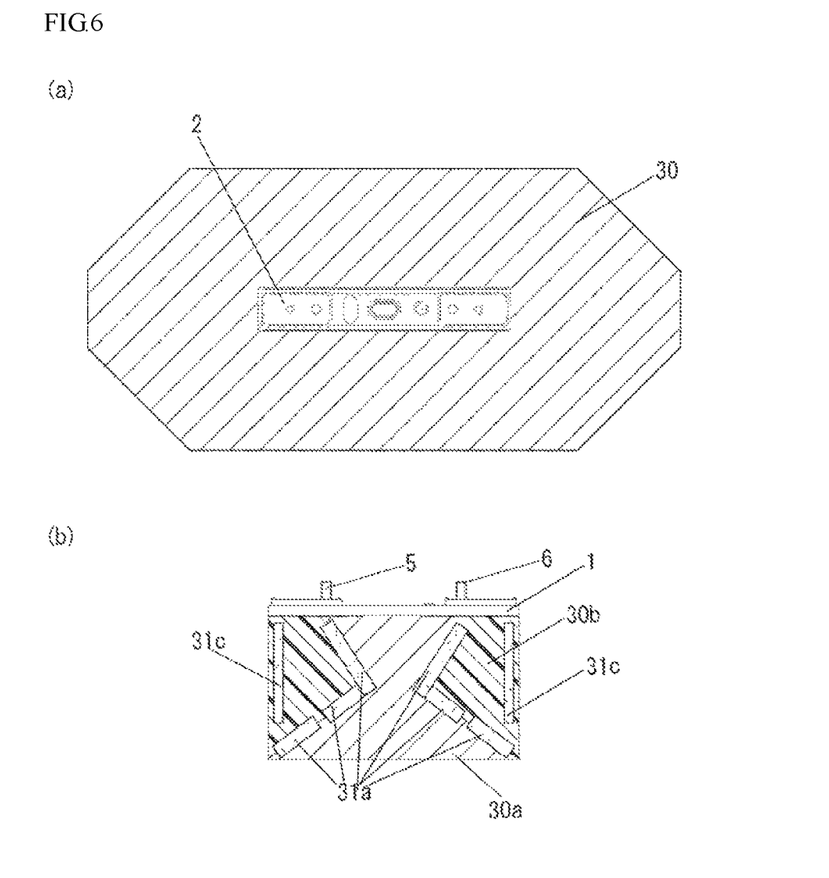

Moreover, in the above Embodiment, the shape of the cut-off area in the insulation sheet 30 is a square, but may be a triangle as shown in FIG. 6(a), or may be a tetragon other than a square, a part of a circle or an oval, or an irregular shape. For example, as shown in FIG. 6(a), when triangles are cut off, the folding form of the insulation sheet 30 appearing in the long side surface of the outer can is a shape as shown in FIG. 6(b).

In order to fully cover the entire surfaces of the outer can (including the boundary between the long side surface and short side surface) by the folding, it is preferable to meet the following formula:

$$L4-(L1)/2 < L6 \leq (L4)/2,$$

wherein L1 is a width of the outer can; L2 is a height of the outer can, L3 is a thickness of the outer can; a width of the insulation sheet 30 is represented by L3+2L5; a length of the insulation sheet 30 is represented by L1+2L4; and L6 is a length of a cut-off (cf. FIG. 7).

In the above Embodiment, the overlapped portion of the insulation sheet 30 is positioned in the long side surface of the outer can, but the portion may be positioned in the short side surface of the outer can.

The insulation sheet may be attached after the cell assembly, or may be attached to the outer can before the cell assembly.

As explained above, according to the invention, it is possible to surely cover and insulate the surface of the outer can by a simple method for folding a piece of insulation sheet. In addition, since the overlap portion of the insulation sheet is not positioned at the bottom of the outer can (it is positioned in the side surface of the outer can), a variation in height of the cell is decreased. Furthermore, all edges of the insulation sheet is positioned the above bottom of the outer can (an opening side), and thereby a short circuit due to dew condensation water can be prevented. Thus, the industrial applicability of the present invention is significant.

What is claimed is:

1. A prismatic cell comprising:
 a prismatic outer can having an opening at the top thereof and a closed bottom;
 a sealing body for sealing the opening; and
 positive and negative electrode external terminals that are protruded from and insulated from the sealing body,
 wherein the prismatic outer can is covered on side surfaces and the entire bottom with a piece of folded insulation sheet and wherein all edges of the insulation sheet are positioned above the closed bottom of the prismatic outer can.

2. The prismatic cell according to claim 1, wherein
 the bottom of the prismatic outer can is covered only by a piece of insulation sheet,
 the side surfaces of the prismatic outer can have a part covered with only one piece of the insulation sheet and a part covered with multiple folded insulation sheet formed by folding the insulation sheet.

3. The prismatic cell according to claim 2, wherein
 the insulation sheet is composed of a heat welding film, and
 there is fixed by heat-welding at least an area with more overlaps near the boundary where the number of overlaps of the insulation sheet changes on the side surface of the prismatic outer can.

4. The prismatic cell according to claim 3, wherein the heat welding film is formed of polystyrene, polyolefin or polyester.

5. The prismatic cell according to claim 1, wherein an adhesive layer is provided at least on a part of the insulation sheet on the side in contact with the prismatic outer can.

6. The prismatic cell according to claim 2, wherein an adhesive layer is provided at least on a part of the insulation sheet on the side in contact with the prismatic outer can.

7. The prismatic cell according to claim 5, wherein the adhesive layer is provided at least at the upper end of the insulation sheet which is contacted with the side surface having the largest area of the prismatic outer can.

8. An assembled battery composed of a plurality of the prismatic cells according to claim 1.

9. An assembled battery composed of a plurality of the prismatic cells according to claim 2.

10. A method for manufacturing a prismatic cell comprising:
 a prismatic outer can having an opening at the top thereof and a closed bottom;
 a sealing body for sealing the opening; and
 positive and negative electrode external terminals that are protruded from and insulated from the sealing body,
 wherein the method comprises:
 an insulating sheet covering step for folding a piece of insulation sheet to cover side surfaces and the entire bottom of the prismatic outer can and wherein all edges of the insulation sheet are positioned above the closed bottom of the prismatic outer can.

11. The method for manufacturing a prismatic cell according to claim 10, wherein
 the insulation sheet is rectangular, and
 the insulation sheet covering step comprises:
 an arranging step for arranging the prismatic outer can in the center of the insulation sheet so that each side of the bottom of the outer can is parallel to each side of the rectangular insulation sheet;
 a fold step for folding the insulation sheet from the bottom to the four side surfaces; and
 a fixing step of the insulation sheet in which a part of the insulation sheet not covering the outer can is folded toward the side surface having the largest area of the prismatic outer can and then at least the region with more overlaps is adhered and fixed near the boundary where the number of overlaps of the insulation sheet changes in the side surface of the prismatic outer can.

12. The method for manufacturing a prismatic cell according to claim 11, wherein
 the insulation sheet is composed of a heat-welding film,
 the adhesive fix is heat welding, and
 four corners of the insulation sheet are cut off.

13. The method for manufacturing a prismatic cell according to claim 10, wherein an adhesive layer is provided at least on a part of the insulation sheet on the side in contact with the prismatic outer can.

14. The method for manufacturing a prismatic cell according to claim 11, wherein an adhesive layer is provided at least on a part of the insulation sheet on the side in contact with the prismatic outer can.

15. The method for manufacturing a prismatic cell according to claim 13, wherein the adhesive layer is provided at least at the upper end of the insulation sheet which is contacted with the side surface having the largest area of the prismatic outer can.

16. The prismatic cell of claim 1, wherein the prismatic outer can has a bottomed rectangular cylindrical shape; and the prismatic outer can and the sealing body are welded to each other to seal the opening.

* * * * *